United States Patent [19]
Ventriglio et al.

[11] 3,729,902
[45] May 1, 1973

[54] CARBON DIOXIDE SORBENT FOR CONFINED BREATHING ATMOSPHERES

[76] Inventors: Frank J. Ventriglio, 790 Fairview Avenue; David M. Zall, 10 N. Southwd Avenue; Cyril J. Stockhausen, 1977 Fairfax Road, all of Annapolis; Donald R. Decker, Jr., 14-17 Taylor Avenue, Baltimore, all of Md.

[22] Filed: Apr. 21, 1971

[21] Appl. No.: 136,168

Related U.S. Application Data

[62] Division of Ser. No. 755,548, Aug. 27, 1968, Pat. No. 3,619,130.

[52] U.S. Cl. ..................................................55/389
[51] Int. Cl. ..............................................B01d 53/04
[58] Field of Search..................55/68, 75, 59, 179, 55/389, 62; 252/455 Z; 23/260, 262, 281, 283

[56] References Cited

UNITED STATES PATENTS

| | | |
|---|---|---|
| 3,085,379 | 4/1963 | Kiyonaga et al...................55/62 |
| 3,479,797 | 11/1969 | Spencer et al.....................55/62 |
| 2,963,519 | 12/1960 | Kasperik et al....................55/75 |
| 2,992,703 | 7/1961 | Vasan et al.......................55/75 |
| 3,203,771 | 8/1965 | Brown et al. .....................55/59 |
| 3,355,860 | 12/1967 | Arnoldi............................55/75 |
| 3,483,137 | 12/1969 | Spensel...........................55/75 |

Primary Examiner—Charles N. Hart
Attorney—Q. E. Hodges et al.

[57] ABSTRACT

An apparatus for removing $CO_2$ from air by passing said air through sorbent material made by treating molecular sieve-type zeolite with aqueous solution of any alkali carbonate. The sorbent material may be regenerated repeatedly by passing either heated air or superheated steam therethrough.

3 Claims, 1 Drawing Figure

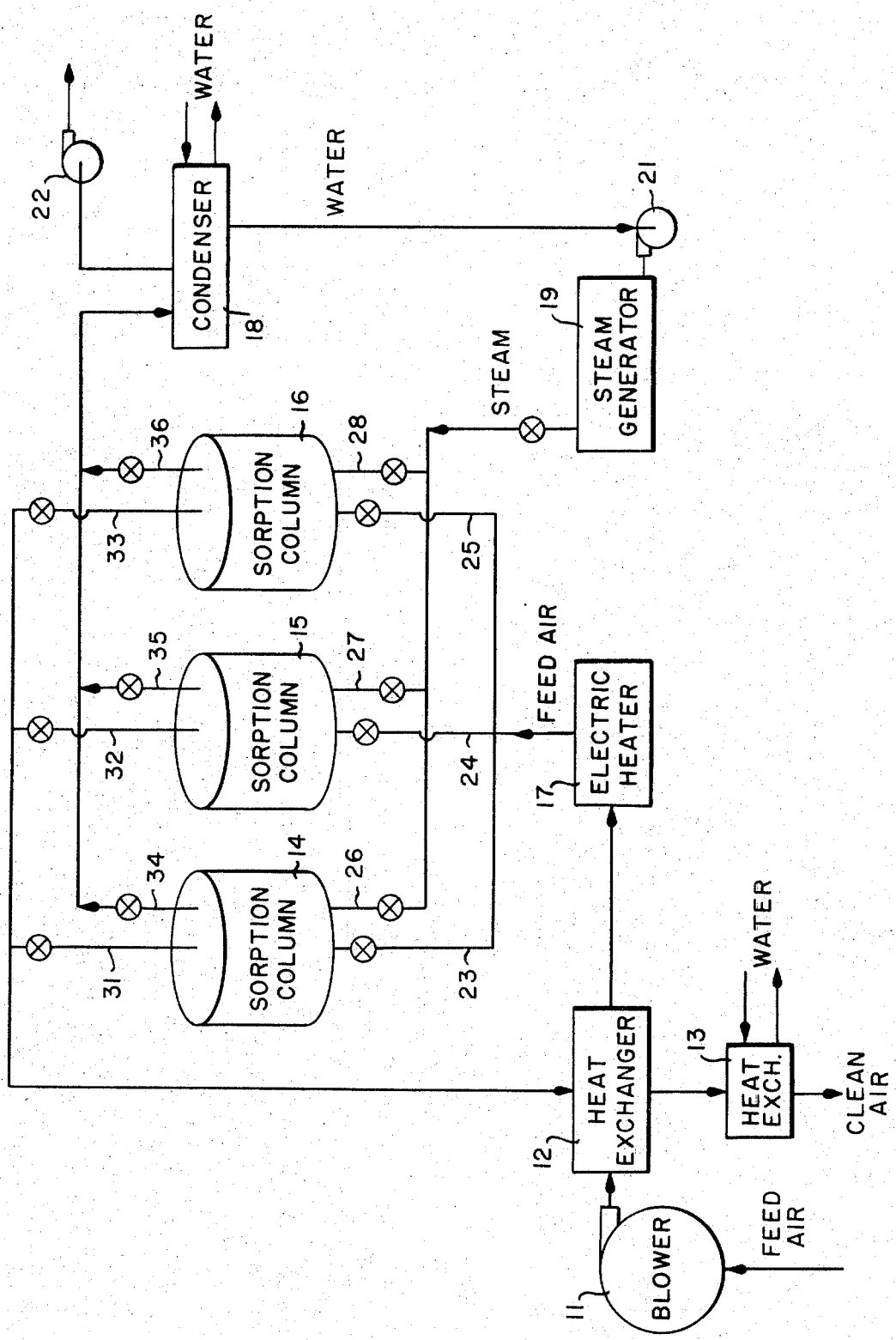

CARBON DIOXIDE SORBENT FOR CONFINED BREATHING ATMOSPHERES

This is a division of application Ser. No. 755,548, filed Aug. 27, 1968, and now U.S. Pat. No. 3,619,130.

The invention described herein may be manufactured and used by or for the Government of the United States of America for governmental purposes without the payment of any royalties thereon or therefor.

BACKGROUND OF THE INVENTION

The present invention relates to an apparatus for removing unwanted gas from confined breathing atmospheres and more particularly to a method for making and using a new, easily regenerable, dry $CO_2$ sorbent.

Methods and materials for removing carbon dioxide from confined breathing atmospheres such as found in submarines and spacecraft have been known for some time. Representative of such techniques is the use of activated carbon, specially formed sodium aluminum silicate compounds and alkali hydroxides. However, such prior art methods suffer from a number of disadvantages and limitations.

It has been recently recommended that the carbon dioxide ($CO_2$) concentration in ecological atmospheres be maintained at or below 0.5 percent. The objective of the present invention is to develop a dry $CO_2$ sorbent system which will meet the new requirements and at the same time eliminate a number of problems associated with the existing systems and materials.

For example, activated carbon has relatively low absorption capacity at low pressures (below 50 psig) and its absorption capacity increases as temperature decreases requiring precooling of the bed before adsorption as well as continuous precooling of the inlet feed gas mixture containing the $CO_2$ to be removed.

Sodium aluminum silicate compounds have high affinity for water vapor which reduces the overall $CO_2$ absorption capacity and which requires an elaborate predrying system for the inlet feed gas mixture. In addition, any moisture picked up during absorption must be driven off by heating the sorbent to at least 600°F if the sorbent is to be regenerated by the use of steam or water. Furthermore, in order to achieve maximum adsorption, the bed must be precooled to below room temperature before each subsequent $CO_2$ absorption. Also, the inlet gas mixture must be precooled continuously to aid in removing moisture and to increase overall $CO_2$ capacity.

Alkali hydroxides are subject to moisture attack with subsequent caking thus severely limiting capacity. In addition, such mixtures are regenerable only under the most severe and impractical conditions.

Accordingly, it is an object of the present invention to provide an improved material for effecting absorption of $CO_2$ from confined breathing atmospheres.

Another object of the present invention is to provide a method for making said $CO_2$ sorbent material.

A further object of this invention is to provide a method for regenerating said $CO_2$ sorbent material when spent.

These and other objects are achieved by providing a new, regenerable dry $CO_2$ sorbent material which possesses a number of advantageous characteristics.

The above objects and advantages may be further understood by reference to the following detailed description taken in conjunction with the accompanying drawing, in which:

The sole FIGURE is a flow diagram embodying the process of the invention particularly suited for use in confined breathing environments.

Investigations indicate that the material will remove $CO_2$ at atmospheric pressure and at a temperature as high as 300°F. At this temperature, for an air feed containing 0.5% $CO_2$, the $CO_2$ loading of the sorbent (defined as grams of $CO_2$ sorbed per gram of original sorbent used) is about 1 percent when the effluent gas leaving the system reaches 0.2 percent. For 80 percent of the sorption time, at this temperature of 300°F, the effluent gas will be free of $CO_2$. The sorbent can be quickly regenerated, that is freed of $CO_2$, by a short-term purging of the sorbent bed with 400°F superheated steam at atmospheric pressure. The subsequent sorbent step can be started immediately after the steam purge is completed.

The new $CO_2$ sorbent is based on the concept of distributing $K_2CO_3$ on an adsorbent material possessing a large surface area per unit volume. Previous work indicated that the deposition of $K_2CO_3$ on activated carbon yielded a dry $CO_2$ sorbent which possessed a greater $CO_2$ capacity than untreated activated carbon. Untreated molecular sieves exhibit a greater affinity for $K_2CO_3$ than does activated carbon. The new $K_2CO_3$ treated sieve sorbent not only possesses a $CO_2$ sorption capacity greater than the $K_2CO_3$ impregnated carbon, but also is stable under rigorous regeneration conditions.

The modified sorbent is made by treating a proprietary synthetic zeolite material (as for example, 10A., 8–12 mesh Molecular Sieve No. 544, manufactured by W.R. Grace and Company, Davison Chemical Div., Baltimore, Md.) with an aqueous solution of potassium carbonate ($K_2CO_3$). The treatment consists of adding the aqueous $K_2CO_3$ solution to the dry molecular sieve and allowing the ensuing reaction to proceed to completion. The excess solution is then decanted. The resultant reaction product is dried at 280°F.

X-ray diffraction analysis has shown the major identifiable constituent in the treated material to be identical to the diffraction pattern obtained from pure molecular sieves. However, significant differences in X-ray diffraction pattern intensities have been observed between treated and untreated samples. The diffraction intensity of the treated material is less than that of the untreated material. Since the diffraction intensity is an indication of the amount of crystalline material present in the sample, a reduction in the diffraction intensity indicates that a significant change is occurring in the molecular structure of the zeolite. One possibility is that a portion of the highly crystalline zeolite material may be undergoing a change to an amorphous state. The remaining crystallinity is due to residual, untransformed zeolite.

Although no identifiable $K_2Co_3$ X-ray diffraction pattern could be observed in the treated material, chemical analysis nevertheless yields a $K_2CO_3$ composition of greater than 5 percent by weight. The $K_2CO_3$ in the treated material is probably responsible for the major portion of $CO_2$ sorption.

In a dry $CO_2$ removal system the sorbent bed is packed with a material which sorbs $CO_2$ upon contact with moist air containing $CO_2$. After the sorbent has been loaded with $CO_2$ to the desired point, the sorbent is regenerated by a process which usually includes a heating step. In such a system the effectiveness of the sorbent under a variety of conditions, ease of regeneration and sorbent bed volume are prime considerations.

The more effective a sorbent is in $CO_2$ removal, the greater will be the amount of $CO_2$ contained in the smallest practical volume. The easier it is to release the $CO_2$ from the sorbent, the milder the regeneration techniques, the shorter the time, and the smaller the equipment needs. The problem of sorbent bed volume is particularly important in a submarine because of the overall volume and power limitations. Although larger beds provide for longer operating cycles and fewer regenerations, they also require an increase in the size of the auxiliary equipment and power.

By way of example, a sorption bed comprising a jacketed 20-inch long stainless steel cylindrical column of 2-inch inside diameter was provided. Water or steam may be circulated in the jacket to control the temperature of the bed. Five equispaced chromel-alumel thermocouples are imbedded along the longitudinal center of the column. The ends of the column are sealed with gasketted stainless steel caps. The column is usually packed with dry sorbent to a height of 18 inches (just below the top thermocouple). This thermocouple is used to measure the effluent gas temperature.

Prior to sorption, atmospheric air is compressed and mixed with $CO_2$ from a high pressure $CO_2$ cylinder to give the proper $CO_2$ concentration.

The gas mixture then passes through a humidifier. The highest humidity that has been obtained in this system is 30 percent relative humidity (RH), measured at atmospheric pressure and 80°F.

The desired feed gas temperature is obtained by passing the humidified gas mixture, first, through 50 feet of coiled copper tubing which is immersed in a thermostatically controlled water bath, then into an insulated temperature-controlled surge tank, and finally into an electrically heated temperature controlled ¼-inch inside diameter feed pipe leading to the bottom of the column.

Water from the same water bath used for feed gas temperature control, or steam from the generator is continuously passed through the outer jacket during sorption to control bed temperature.

During sorption the feed gas enters the column from the bottom and flows upward through the packed section. The $CO_2$ concentration of the effluent gas (or feed) is continuously monitored by an infrared analyzer and the results recorded. The column temperatures, as well as all other control temperatures, also are continuously recorded. Four humidity probes continuously monitor the feed and effluent moisture content. The volumetric flow rate is measured with a wet test meter.

Two examples are given to illustrate different regeneration procedures. The results of the regeneration procedure are covered separately below.

Commercially available, prior art molecular sieves possessing an effective pore size of 10 angstroms were modified with aqueous alkali carbonate treatment.

For example, a concentrated aqueous solution of potassium carbonate may be made up by dissolving 240 grams of potassium carbonate in 560 grams of water. This solution is then added to 780 grams of prestructured sodium aluminum silicate beads, having a mesh size from 8–12, and an initial effective pore size of 10 angstroms.

The ensuing reaction is allowed to proceed to completion. The excess solution is then decanted and the remaining reaction product is dried in an oven at 130°C, under a vacuum of 15 inches of mercury, for 24 hours.

The first series of $CO_2$ sorption experiments was performed on both modified and unmodified sieve samples to determine their comparative capacities (after regeneration) for $CO_2$ removal. Table 1 contains representative sorption results obtained from these experiments.

Individual sorbents in Table 1 are labeled with the experimental series number 3, followed by a sorbent designator. The odd number following the designator identifies the sorption run. Consecutive sorption runs possess consecutive odd numbers beginning with the number one for the first sorption. Regeneration runs which are not shown were identified by even numbers.

The regeneration procedure used in this series of experiments consisted of first heating the sorption bed to 300°F by passing saturated steam through the jacket surrounding the column. When the internal pressure of the column reached 10 psig, a vacuum of 28 inches Hg was drawn. Superheated steam at 260°F was then passed through the bed for 10 minutes. The steam flow into the bed was controlled by maintaining a 10 inch Hg vacuum within the bed. Once steam flow through the bed was stopped, a vacuum of 28 inches Hg was again drawn for an additional 15 minutes. During the initial heating and 28 inch vacuum period, approximately one-third of the sorbed $CO_2$ was released. The remaining $CO_2$ was released during the period of steam flow through the bed. The final vacuum period was for the removal of excess water from the sorbent.

Sorbent 3P was untreated molecular sieves. All sorbent samples, including sample 3P, were subjected to the regeneration procedure prior to the first sorption.

Sorbents 3M, 3N, and 3I were sieves treated with aqueous alkali carbonate solutions possessing different formulations. $K_2CO_3$ was used in Sorbents 3M and 3N, while the alkali carbonate used in Sorbent 3I was sodium carbonate.

The untreated but "regenerated" sieves possess a capacity of approximately 0.3 percent loading at breakthrough. Loading is defined as the grams of $CO_2$ sorbed per gram of original packing used. Breakthrough refers to the point in time at which the bed allows $CO_2$ to come through with the effluent gas. At this point the $CO_2$ removal efficiency of the bed is no longer 100 percent.

Under similar sorption-regeneration conditions, all of the alkali carbonate-treated sieve samples possessed a $CO_2$ breakthrough capacity at least several times greater than that of the untreated sieves. Sample 3M had a $CO_2$ breakthrough capacity at least several times greater than that of the untreated sieves. Sample 3M had a $CO_2$ breakthrough capacity of about 1.7 percent. Sample 3N, which was made up from one-half of the quantity of $K_2CO_3$ used in Sample 3M, had a capacity of about 1.2 percent. Sample 3I, in which $Na_2CO_3$ was used to modify the sieves, had a $CO_2$ breakthrough capacity in the neighborhood of 1.7 percent.

Table 2 shows the results of the second series of sorption runs made on a $K_2CO_3$ impregnated sieve sample. Elevated temperature sorption runs were made at both atmospheric pressure and at 80 psig. Regenerations were made by superheated steam purging without the aid of vacuum. Preforming the sorptions at elevated temperatures reduced the time required for subsequent regeneration to a point where it could be completed in about 10 minutes.

TABLE 1.—$CO_2$ SORPTION RUNS ON UNTREATED AND MODIFIED MOLECULAR SIEVES

| Sorbent type | Run No. | Sorbent formulation | | | Dried bed weight, grams | Inlet feed conc., percent $CO_2$ | Sorption pressure, p.s.i.g. | Inlet air temp., °F. | Length of Time to break, min. | Amount $CO_2$ sorbent to break, grams | $CO_2$ loading at break, percent | Total time to end of run, min. | Eff. $CO_2$ conc. at end of run, percent $CO_2$ | Amount $CO_2$ sorbed to end of run, grams | $CO_2$ loading at end of run, percent | Gas flow rate stand. s.c.f.m. |
|---|---|---|---|---|---|---|---|---|---|---|---|---|---|---|---|---|
| | | MS | $K_2CO_3$ | $H_2O$ | | | | | | | | | | | | |
| Untreated | 3P1 | 140 | | | 800 | 0.962 | 35 | 85 | 14 | 2.78 | 0.35 | 22 | 0.96 | 3.54 | 0.44 | 0.372 |
| | 3P3 | | | | | 0.982 | 34 | 86 | 13 | 2.62 | 0.33 | 23 | 0.98 | 3.61 | 0.45 | 0.371 |
| | 3P5 | | | | | 1.00 | 34 | 85 | 11 | 2.28 | 0.29 | | 0.05 | 2.28 | | 0.372 |
| | 3M3 | 1,140 | 210 | 863 | 850 | 0.998 | 29 | 81 | 72 | 14.88 | 1.75 | 76 | 0.20 | 15.63 | 1.84 | 0.372 |
| | 3M5 | | | | | 0.98 | 34 | 85 | 72 | 14.58 | 1.72 | 85 | 0.20 | 16.94 | 1.90 | 0.372 |
| | 3M9 | | | | | 1.00 | 34 | 84 | 71 | 14.65 | 1.73 | | 0.05 | | | 0.372 |
| | 3M11 | | | | | 1.03 | 34 | 82 | 72 | 15.35 | 1.75 | | 0.20 | | | 0.372 |
| Modified | 3N3 | 1,140 | 105 | 860 | 813 | 0.96 | 34 | 83 | 51 | 10.15 | 1.25 | 78 | 0.20 | 16.51 | 1.95 | 0.373 |
| | 3N5 | | | | | 0.99 | 34 | 82 | 45 | 9.75 | 1.14 | 53 | 0.20 | 9.81 | 1.29 | 0.373 |
| | 3N7 | | | | | 0.99 | 34 | 80 | 48 | 9.90 | 1.22 | 48 | 0.20 | 10.46 | 1.21 | 0.374 |
| | 3I3 | 760 | ¹ 200 | 570 | 720 | 1.47 | 30 | 82 | 40 | 12.22 | 1.70 | 51 | 0.20 | 13.92 | 1.94 | 0.376 |
| | 3I7 | | | | | 1.49 | 30 | 83 | 40 | 12.38 | 1.73 | 46 | 0.20 | 14.30 | 1.94 | 0.375 |
| | 3I9 | | | | | 1.03 | 30 | 83 | 57 | 12.22 | 1.70 | 67 | 0.20 | 14.14 | 1.97 | 0.374 |
| | 3I11 | | | | | 1.03 | 30 | 83 | 60 | 12.38 | 1.79 | 70 | 0.20 | 14.81 | 2.06 | 0.373 |

¹ $Na_2CO_3$ used instead of $K_2CO_3$.

NOTE.—Temp.=Temperature; Stand.=Standard; Eff.=Effluent; MS=Molecular sieves; Conc.=Concentration.

TABLE 2.—ELEVATED TEMPERATURE SORPTION RUNS ON $K_2CO_3$ IMPREGNATED SIEVES

| Run No. | Feed, percent $CO_2$ | Pressure, p.s.i.g. | Gas flow rate, s.c.f.m. | Temperature range bed initial, °F. | Temperature range bed final, °F. | Time to break, min. | Loading to break, grams | Loading to break, percent | Time to 0.2% eff., min. | Total loading to 0.2% eff., grams | Total percent loading to 0.2% eff. |
|---|---|---|---|---|---|---|---|---|---|---|---|
| 7A 1 | 0.54 | +30 | 0.489 | 233–273 | 266–212 | 57 | 8.38 | 0.98 | 73 | 10.21 | 1.19 |
| 7A 3 | 0.54 | +30 | 0.489 | 320–302 | 302–302 | 55 | 8.08 | 0.94 | 67 | 9.47 | 1.10 |
| 7A 5 | 0.54 | +30 | 0.489 | 284–320 | 315–320 | 57 | 8.08 | 0.98 | 72 | 10.07 | 1.17 |
| 7A 7 | 0.54 | +30 | 0.504 | 284–302 | 321–302 | 55 | 8.33 | 0.97 | 68 | 9.86 | 1.14 |
| 7A 9 | 0.54 | +30 | 0.489 | 356–311 | 305–302 | 48 | 7.10 | 0.82 | 59 | 8.32 | 0.97 |
| 7A 11 | 0.54 | +2 | 0.489 | 248–266 | 266–302 | 50 | 8.64 | 1.00 | 75 | 10.48 | 1.21 |
| 7A 13 | 0.56 | +30 | 0.504 | 230–284 | 280–302 | 51 | 8.79 | 1.02 | | | |
| 7A 15 | 0.54 | +30 | 3.489 | 311–311 | 338–302 | 55 | 11.70 | 1.36 | 68 | 10.38 | 1.20 |
| 7A 17 | 0.60 | +30 | 0.489 | 77–77 | 86–104 | 72 | 8.28 | 0.96 | | | |
| 7A 19 | 0.54 | +2 | 0.50 | 334–334 | 320–302 | 55 | 7.52 | 0.87 | 59 | 8.85 | 1.02 |
| 7A 21 | 0.54 | +2 | 0.50 | 302–310 | 320–302 | 50 | 7.56 | 0.88 | | | |
| 7A 23 | 0.58 | +2 | 0.504 | 266–300 | 208–221 | 47 | 7.30 | 0.85 | 58 | 8.69 | 1.0 |
| 7A 25 | 0.62 | +2 | 0.50 | 230–300 | 212–248 | 41 | 7.15 | 0.84 | | | |
| 7A 27 | 0.56 | +2 | 0.50 | 267–284 | 271–257 | 46 | | | | | |

NOTE.—Min.=minute; Eff.=effluent.

Prior to the first sorption the dry packing was steam purged for 10 minutes. Initially, the packing temperature was raised to 244°F by externally heating the column walls. Superheated steam which was obtained by throttling 30 psig saturated steam to 2 psig was then passed through the column.

Prior to subsequent regenerations, the packing temperature was maintained above 200°F during sorption by preheating the feed gas mixture. Also, a small amount of steam was continuously passed through the outer jacket of the column in order to maintain a high enough temperature at the wall of the column to prevent steam condensation during regeneration. Superheated steam purging and sorption followed each other alternately.

The first four sorptions (7A 1 – 7A 7) were run at 30 psig. The feed gas which consisted of 30 percent RH (atmospheric pressure and 80°F) air containing 0.54 percent $CO_2$, was preheated to a temperature of about 320°F. $CO_2$ loadings to zero breakthrough ranged from 0.94 to 0.98 percent. The loadings to 0.2 percent $CO_2$ in the effluent gas ranged from 1.10 to 1.19 percent. The sorption pressure used in runs 7A 9, 13, 21, 25, and 27, was 2 psig. Zero breakthrough loadings ranged from 0.82 to 0.87 percent. The 0.2 percent $CO_2$ effluent loadings were about 1 percent. With the exception of Run 7A 17, which was performed at room temperature, humidity measurements indicated that moisture was released by the packing to the heated gas stream during sorption.

For identical low temperature steam regeneration conditions, the results obtained in the first series of experiments presented in Table 1 indicate that the alkali carbonate-treated sieves have a $CO_2$ sorption capacity several times greater than the untreated sieves. This increased $CO_2$ capacity of the treated sieves can be attributed to the ability of the $K_2CO_3$ to react with $CO_2$ in the presence of $H_2O$ to form $KHCO_3$. Upon steam regeneration, energy is supplied to reverse the reaction. During regeneration the $KHCO_3$ breaks down to give $K_2CO_3$, $H_2O$, and gaseous $CO_2$ which is swept out of the bed by the purging steam.

On the other hand, the untreated molecular sieves possess a greater affinity for moisture than for $CO_2$. During steam regeneration the untreated sieve sorbs moisture which if not removed prior to the subsequent sorption, prohibits the sieve from absorbing a substantial quantity of $CO_2$. Thus, if moisture was adsorbed on the bed during sorption, or if steam was used as a purge gas during regeneration, a number of bed drying steps must be used to prepare the bed for subsequent sorption. These steps must include heating the bed to 600°F, and applying either a vacuum to draw off the adsorbed water, or a 600°F gas purge to carry off the moisture and dry the bed.

The second series of experiments (Table 2) were performed to determine the feasibility of using $K_2CO_3$ impregnated sieves for submarine systems. The results indicated that the regenerated material will sorb $CO_2$ at atmospheric pressure and at 300°F. At this temperature for a moist air feed containing 0.5% $CO_2$, the $CO_2$ loading of the sorbent is about 1 percent, when the effluent gas leaving the system reaches 0.2 percent. For 80 percent of the sorption time at this temperature, the effluent gas will be free of $CO_2$. The sorbent can be quickly regenerated by a short-term purging of the bed with 400°F superheated steam at atmospheric pressure. The subsequent sorbent step can be started immediately after the steam purge is completed.

Taking these operational characteristics into account and using Run 7A 21 as a basis for scale-up design, the following describes a shipboard system in which the $K_2CO_3$ impregnated sieve is used.

Referring now to the drawing, the $CO_2$ sorbent system adaptable for use in a confined breathing environment includes a blower 11 for introducing feed air into the sorbent system. The feed air is passed through a gas-to-gas heat exchanger 12 in which the feed air is heated from the effluent air from the sorption columns 14, 15, 16. An electric heater 17 further heats the feed air which is then split and passed through parallel sorption columns 14, 15, 16 via respective lines 23, 24, 25. Valves included in each of lines 23, 24, 25 may be used to prevent feed air from entering any column which is being regenerated. Upon leaving the sorption columns, the $CO_2$-purged air is fed through lines 31, 32, 33 through the heat exchanger 12 where it is used to heat the feed air and then is passed through heat exchanger 13 where it is cooled by means of circulating water such as seawater. Finally, the clean air is discharged to the breathing environment.

After a predetermined exposure time, a sorption column is removed from the line by closing the appropriate line input valve. Regeneration is achieved by passing superheated steam fed through lines 26, 27 28 through respective columns 14, 15 and 16. The steam is generated by means of a steam generator 19 which is supplied with water from condenser 18 pumped by means of water pump 21.

As steam is passed through the column, the sorbed $CO_2$ is released as a gas which is swept from the column by the purging steam and passes together with the steam through the respective line 34, 35, 36 into water-cooled condenser 18 where the steam is condensed to water and gaseous $CO_2$ is lowered in temperature. The $CO_2$ is then pumped outside the environment by means of discharge pump 22.

By way of giving an example of an actual sorption system used to remove $CO_2$ from a feed-air mixture at the rate of 15 lbs. of $CO_2$ an hour using a $K_2CO_3$ impregnated sieve. The sorption columns are sized for 1 hour sorption and 30 minutes regeneration.

The blower continuously feeds 472 cubic feet per minute of submarine air containing 0.5 percent $CO_2$ to the system. The feed gas is first passed through the gas-to-gas heat exchanger in which 300°F effluent air from the sorption beds heats the feed gas to 250°F. The feed gas then passes through a 10.7 kw electric heater where the gas temperature is raised to 320°F. The discharge air from the heater travels to a manifold and thence to the entrance of the three, parallel, sorption beds. One-half of the air at 472 cubic feet per minute flows through each of the remaining sorption beds. Upon leaving the sorption bed the 300°F effluent gas enters a return manifold which takes it to the heat exchanger used to preheat the feed gas. The temperature of the effluent gas leaving the preheater is 130°F. Before being returned to the submarine atmosphere the 130°F effluent gas passes through a seawater heat exchanger in which the effluent gas temperature is lowered to 80°F.

After a sorption exposure time of an hour, a bed is taken off the line so that it may undergo regeneration. During the regeneration period 2.5 pounds per minute of 400°F (at 2 psig) superheated steam are passed through the column. Passage of the steam through the column releases the sorbed $CO_2$ as a gas. The $CO_2$ gas is swept from the column by the purging steam and passes together with the steam into a chill water-cooled condenser. In this condenser the steam is condensed to 90°F water and the $CO_2$ to 90°F gas. The water is pumped back to the 50 kw steam generator which is making 400°F superheated steam at 80 psig. The steam is throttled to 2 psig before it is sent to the column undergoing regeneration.

Proper programming of the valves insures a continuous uninterrupted process.

Having described the invention, it will be apparent that many modifications will be obvious to one skilled in the art and, consequently, the scope of the invention is to be measured solely by the following claims.

What is claimed is:

1. A gas purification system for removing carbon dioxide from a gas mixture comprising:
   at least one sorption column comprised of molecular sieve material treated with aqueous alkali carbonate for absorbing carbon dioxide from said gas mixture;
   means for supplying said gas mixture to said sorption column;
   a steam generator; and
   means to stop the flow of said gas mixture to said sorption column and to connect said steam generator to said sorption column to regenerate said molecular sieve treated with aqueous alkali carbonate by direct contact with steam.

2. A gas purification system for removing carbon dioxide from a gas mixture as set forth in claim 1 wherein:
   said means for supplying said gas mixture includes a heat exchanger; and further includes
   means connecting said sorption column to said heat exchanger for passing the purified sorption column effluent through said heat exchanger to thereby heat said gas mixture prior to entering said sorption column.

3. A gas purification system for removing carbon dioxide from a gas mixture as set forth in claim 2 further comprising:
   a blower connected to said heat exchanger for forcing said gas mixture through said heat exchanger and said sorption column; and
   a condenser connected to the regeneration effluent output of said sorption column for condensing said effluent and providing liquid water and free carbon dioxide; and
   the output of said condenser being connected to said steam generator for supplying liquid water to said steam generator.

* * * * *